United States Patent [19]
Wunning

[11] Patent Number: 5,326,255
[45] Date of Patent: Jul. 5, 1994

[54] BURNER WITH RECUPERATIVE AIR PREHEATING AND THERMAL INSULATION BETWEEN THE RECUPERATOR AND THE EXTERNAL CAP OF THE BURNER

[75] Inventor: Joachim Wunning, Leonberg, Fed. Rep. of Germany

[73] Assignee: WS Warmeprozesstechnik GmbH, Renningen, Fed. Rep. of Germany

[21] Appl. No.: 943,738

[22] Filed: Sep. 11, 1992

[30] Foreign Application Priority Data

Sep. 27, 1991 [DE] Fed. Rep. of Germany ....... 4132236

[51] Int. Cl.$^5$ ............................................. F23D 11/44
[52] U.S. Cl. ................................. 431/215; 431/115; 431/167; 431/11; 126/91 A
[58] Field of Search ............... 431/151, 215, 158, 115, 431/116, 11, 167, 350, 159, 187, 160; 126/91 A, 91 R; 432/209, 223

[56] References Cited
U.S. PATENT DOCUMENTS

| | | |
|---|---|---|
| 4,392,818 | 7/1983 | Wunning ................................ 431/11 |
| 4,401,099 | 8/1983 | Collier ................................ 126/91 A |
| 4,877,396 | 10/1989 | Wunning ............................ 431/215 |

FOREIGN PATENT DOCUMENTS

0296032A1 12/1988 European Pat. Off. .
0324043A1 7/1989 European Pat. Off. .

*Primary Examiner*—James C. Yeung
*Attorney, Agent, or Firm*—Frishauf, Holtz, Goodman & Woodward

[57] ABSTRACT

A burner suitable for heating a furnace chamber of an industrial furnace which is equipped with a recuperative preheater for combustion air has a combustion chamber at one end and a feed-through cap at the other end which is accessible outside of a furnace in which the burner is installed. The tubular recuperative preheater is of the coaxial countercurrent flow configuration extending between the combustion chamber and an annular outflow collector cap. A coaxial fuel pipe is centered in the burner extending to the combustion chamber. Overheating of the burner cap is prevented by means of a spacer sleeve of small heat conductivity interposed between the preheater and the burner cap. This permits the valves to be seated in the burner cap without risk of thermal damage. For protection of personnel against contact with hot surfaces, a perforated metal shield is provided between the burner cap and the outflow cap of the recuperator, essentially covering all the portions of the burner outside a furnace wall.

17 Claims, 2 Drawing Sheets

BURNER WITH RECUPERATIVE AIR PREHEATING AND THERMAL INSULATION BETWEEN THE RECUPERATOR AND THE EXTERNAL CAP OF THE BURNER

This invention concerns a burner suitable for heating a furnace chamber of an industrial furnace, the burner being equipped with a recuperative preheater for the combustion air. Such a burner has a combustion chamber and devices for supplying fuel and combustion air into the burner. Of these devices, at least the means for supplying fuel into the burner are at least in part connected to a burner cap or situated in such a burner cap. The recuperator is of tubular shape disposed coaxially with the combustion chamber and the combustion product gases flow through one of its channels while the combustion air flows through another of its channels in countercurrent to the combustion gases, these channels being thermally coupled by a partition that conducts heat. There is a collecting device for the combustion product gases which includes an exhaust gas duct, all coordinated with the recuperator and held in fixed spatial relation to the burner cap to which the burner structure is affixed.

For the conversion of fuel energy into process heat, for example, for the heating of furnace chambers for industrial processes, there has been an increasing use in recent times of burners with recuperative air preheating, so called recuburners. These make it possible in a simple way to recover heat contained in the combustion product gases. As a result of recent development, recuperator burners have been equipped with ceramic recuperators as described, for example, in European Patent Document EP 0324 043 A1 and U.S. Pat. No. 4,877,396. In this case, ceramic materials of high heat conductivity are used, for example, silicon carbide (SIC) which has a heat conductivity $\lambda$ of approximately 100 watts per meter and °Kelvin.

These burners have an exhaust gas outlet in the form of an outflow collector cap for diverting out of the burner the somewhat cooled exhaust gas. This outflow gas collector cap is firmly affixed to an exhaust gas collar or sleeve serving as exhaust gas duct and connected with the recuperator. The burner mounting cap containing the fuel supply channels etc. is connected directly to the outflow gas cap with only a sealing gasket between them or else the outflow gas collector cap is integrated into the burner cap.

It has been found in practice that the burner cap, to which the burner structure is affixed, can become very hot, so that at times the maximum permissible temperature for aluminum castings is exceeded, as a result of which the valves for the fuel supply and in some cases the air supply can no longer be mounted directly on the burner cap, while at the same time the danger of burns by personnel coming into contact with the burner cap is present. Precautions such as thermal insulation of the outflow gas collector cap and/or its cooling with air have been found impractical or insufficient.

SUMMARY OF THE INVENTION

It is an object of the present invention to provide a burner configuration for a recuperative burner having a burner cap for mounting on a wall or casing of an industrial furnace in which the excessive heating of the burner cap can be economically prevented. Briefly, a thermal separating means of low heat conductivity is interposed between the burner cap and the recuperator, for thermally isolating the burner cap.

Such thermal insulation makes it possible to keep the temperature difference between the burner cap and its surroundings to less than 80° K. and, if necessary, even less than 30° K.

The thermal separating means is advantageously disposed in the region between the exhaust gas collecting device, particularly the outflow gas collector cap, and the burner cap. In a preferred embodiment, a spacer sleeve or shell of low heat conductivity material, such as an austenitic steel, is provided for the thermal insulation. The heat conductivity of austenitic steel is many times smaller than that of SiC.

In order to provide a gas tight connection between the burner cap and the recuperator such that it has no dependence upon thermal leakages from the heated parts during furnace operation, it is useful for the thermal insulation means to be resiliently pressed into position in the axial direction. In the case of the above-mentioned spacer sleeve, that signifies that the sleeve should be held by resilient tension rods or strips in gas-tight fashion between the burner cap and either the recuperator or its outflow gas collector cap.

A combustion product gas tubular duct coaxial with the recuperator or a radiant tube can be connected to the annular outflow cap that collects exhaust gas. Especially in the case of such an exhaust gas duct or radiant tube consisting of ceramic material, it is advantageous, for mitigation of temperature stresses at or in the brittle ceramic, for the connection between the outflow collector cap and its upstream gas duct pipe or radiant tube to have spring-pressed elements by which the duct pipe or radiant tube are subjected to an elastic pressing force in the region of sealing surfaces adjacent to the outflow gas collector cap. These resilient pressing elements can, for example, be spring-loaded pressure rods or pins.

In order to avoid the risk of burns, the thermal insulating means and/or the exhaust gas gathering device may at least in part be surrounded by contact protection, which can include a protective element fastened to the burner cap. Such a protective element can, for example, be a protective screen or grid or a perforated sheet of metal that surrounds the gas outlflow cap of the recuperator without touching it.

The novel recuburner can operate with a recuperator made at least in part of ceramic material. According to the purpose of the installation, it can, however, be usefully equipped with a recuperator made of heat resistant steel.

BRIEF DESCRIPTION OF THE DRAWINGS

The invention is further described by way of illustrative example with reference to the annexed drawings, in which.

DESCRIPTION OF THE ILLUSTRATED EMBODIMENTS

Figure 1:
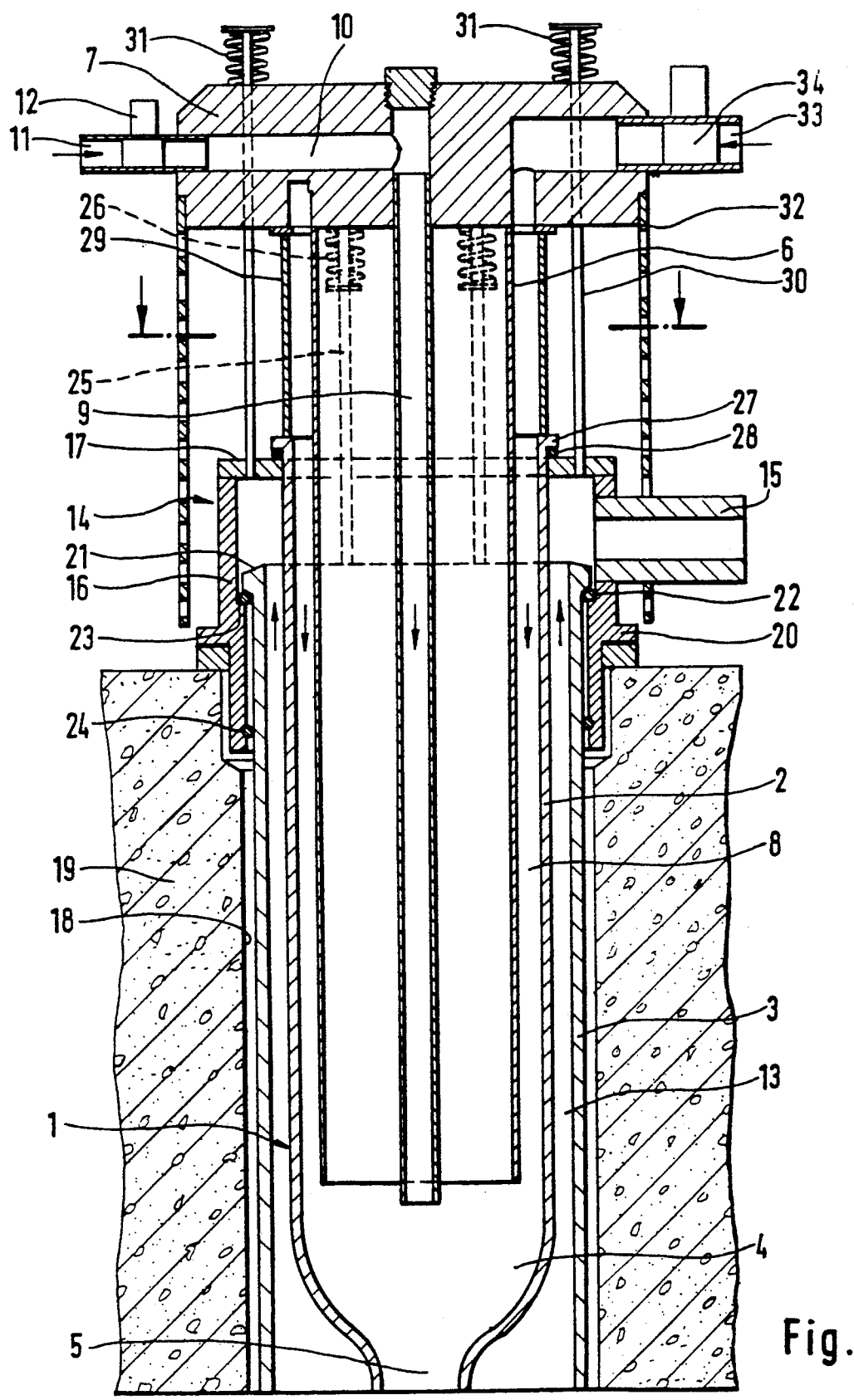
FIG. 1 shows a recuburner according to the invention partly in axial cross-section, partly in side view and partly in schematic representation.
Figure 2:
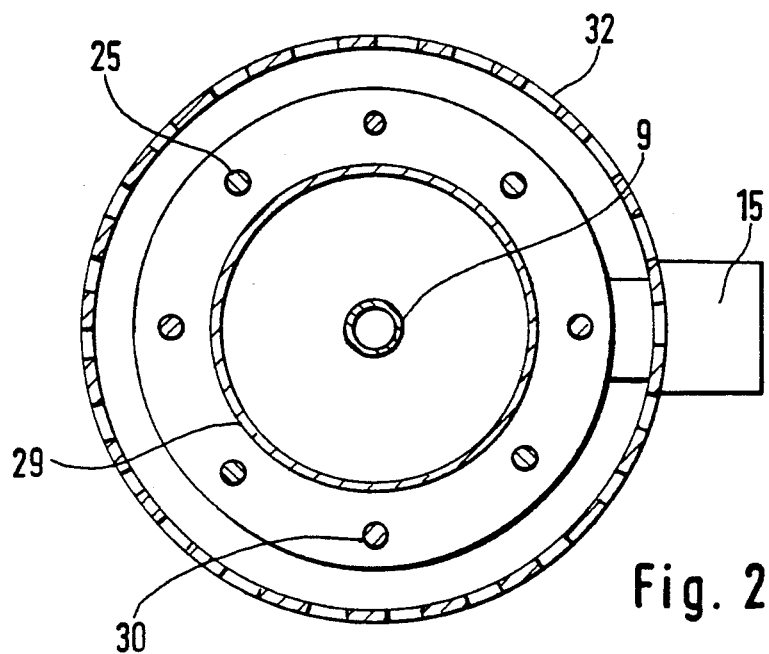
FIG. 2 is a top view of a cross-section of the burner cap of the recuburner of FIG. 1 in a section passing through the line II—II of FIG. 1.

The industrial burner with recuperative air preheating ("recuburner") shown in FIGS. 1 and 2 has a tubular recuperator 1 which consists of an inner cylindrical recuperator pipe 2 consisting of SiC and a combustion product duct pipe 3, likewise of SiC surrounding the recuperator pipe 2 at a radial spacing therefrom. The recuperator pipe 2 contains a combustion chamber 4 from which a coaxial jet nozzle 5 of smaller diameter extends endwise. An air duct cylinder 6 extends into the recuperator pipe 2. It is preferably, as shown, fastened to the burner cap 7 made of die-cast aluminum and provides, with the inner wall of the coaxial recuperator pipe 2 provides the boundary of an annular channel 8 serving as a combustion air duct. A fuel lance 9 is disposed coaxially passing through the air duct cylinder 6, the lance being affixed to the burner cap 7 and being connected with a fuel supply channel 10 formed in the burner cap and leading to a fuel connection fitting 11. The fuel supply can be regulated by a fuel valve 12 downstream of the fitting 11 and held in the burner cap 7.

The combustion product gas pipe 3 and the recuperator pipe 2 define an annular channel 13 between them which, in operation, receives a strong flow of combustion product gases and leads it to an outflow gas collector cap 14, which is an annular cap disposed outside the heated furnace space and has a radially directed exhaust gas pipe or fitting 15 operating as an exhaust gas duct. The outflow gas collector cap 14 consists essentially of a two-part cap consisting of an essentially cylindrical casing part 16 and a cover 17 seated gas-tightly on the cylindrical casing 16. The cover 17 has the shape of an annular disc. The casing 16 is set in a corresponding opening 18 of the furnace wall shown at 19, to which it is held by means of a flange 20 on the exterior. The exhaust gas duct pipe 3 is inserted into the casing part 16 of the annular outflow cap 14. It has an annular flange 21 at its outer end (upper in FIG. 1) which bears against or is supported by an annular shoulder 23 on the inside of the casing part 16 with the interposition of a sealing ring 22. An additional sealing ring 24 seals the annular gap between the respective opposing cylindrical regions of the casing 16 and of the exhaust gas duct pipe 3.

Around the circumference of the exhaust gas pipe 3, there are disposed axially parallel pressure rods 25 which are subject to the effect of the pressure springs 26 and press the exhaust gas duct pipe 3 in the axial direction with its ring flange 21 bearing resiliently against the seal ring 22 and the ring shoulder 23, so that a trouble-free sealing off is produced and temperature stresses no longer affect the brittle ceramic of the exhaust gas duct 3. The pressure rods 25, shown in broken lines in FIG. 1, bear against the burner cap 7 through the pressure springs 26. Furthermore, the recuperator pipe 2 is affixed to the outflow gas collecting cap 14, with its cylindrical part having at its end a ring flange 27, by which it is supported with interposition of a seal ring 28 on the inner portion of the annular cover part 17 of the outflow collecting cap 14.

Between the burner cap 7 and the recuperator 1, a thermal separation means of small heat conductivity is disposed which is provided in the form of a thin-walled spacer sleeve or shell 29 consisting of austenitic steel. This spacer sleeve bears against the annular flange 27 of the recuperator tube 2 at one end and at the other end bears against the inner surface of the burner cap 7, optionally with interposition of gaskets or other seal rings. In order to assure a gas-tight connection between the spacer sleeve 29 and the burner cap 7 as well as the recuperator pipe 2, without the occurrence of temperature stresses at or in the brittle ceramic recuperator pipe 2, tension rods 30 are provided in a circular array around the spacer sleeve 29 at a radial spacing therefrom. These spacing rods are fastened at one end to the cover 17 of the gas outflow cap 14 and extend at their other ends to corresponding bores of the burner cap 17 from which they are supported by compression springs 31.

Finally, in order to avoid the risk of burns as a result of contact with the casing parts 16 and 17 of the exhaust gas collecting device 14 or the spacing sleeve 29, special precautions against contact are provided. This protection against contact has a cylindrical protective wall 32 of perforated metal or of steel screening which is affixed to the burner cap 7 and surrounds, at a radial spacing therefrom, the gas outflow cap parts 16 and 17 without contact with them.

The spacer sleeve 29 at the same time provides a part of a supply duct for combustion air for the combustion chamber 4. This air duct configuration comprises an air supply channel 32 in the burner cap 7 which is connected for output through the spacer sleeve 29 with the annular channel 8 and at its input end connects with an air pipe fitting 33 which is associated with an air regulation valve 34 which extends out of the burner cap 7.

The two annular channels 8 and 13 of the recuperator 1 operate in countercurrent, as is shown by the arrows in FIG. 1 and the combustion air and the combustion product gases respectively flow through them. Since the two annular channels 8 and 13 are thermally coupled together by the pipe 2 of the recuperator which is of heat conducting material, a large part of the quantity of heat contained in the combustion product gases is utilized for the preheating of combustion air. In operation, the gas outflow cap consisting of the metallic casing parts 16 and 17 is indeed subject to considerable heating, but the heat transfer to the burner cap 7 is so small, as a result of the presence of the spacer sleeve 29 and the tension rods 30, that the parts contained in the burner cap 7, for example, the valves 12 and 34, are not impaired and there is also no danger to personnel through burns resulting from touching the burner cap 7. The protective wall 32, as already mentioned, prevents contact with the hot parts 16 and 17 of the gas outflow cap of the recuperator.

Figure 3:
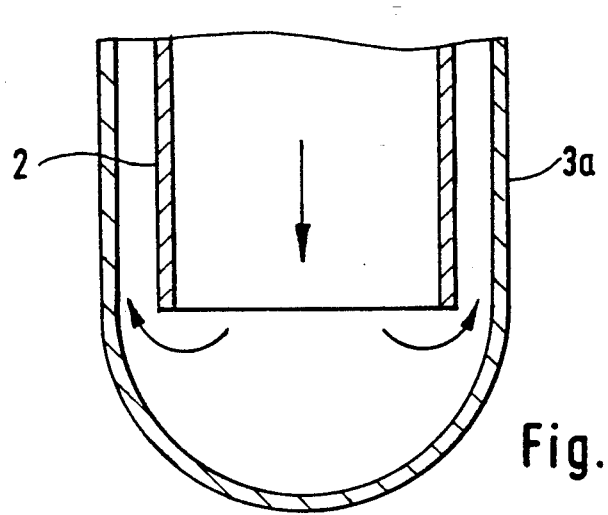
FIG. 3 is a partial view of the tip portion of a modification of the recuburner of FIG. 1 which is an embodiment of the invention in the form of a jacketed jet pipe heater.

The invention has been explained above with reference to FIG. 1 in terms of a recuburner for direct heating. The invention can similarly be applied also to jacketed jet heating tubes (also called radiant tubes). The combustion product gas duct 3 of FIG. 1 is replaced in FIG. 3 by the jacketed or jet tube 3a extending to the end of the burner which is in the furnace.

The effectiveness of the thermal separation between the burner cap 7 and the exhaust gas collecting cap 14 can be illustrated by an example obtained in the practice of the invention.

EXAMPLE

A recuburner having a connected load value of 20 kW corresponding to an air requirement of 20 m³/h has a recuperator pipe 2 of SiC with a diameter of 100 mm. At a furnace temperature of 1200° C., the exhaust gas temperature was 600° C. and the temperature of the recuperator tube 2 at the air intake was about 300° C. With a burner cap 7 directly fastened by a flange, the temperature of the burner cap rose above 200° C.

With a spacer sleeve 29 of stainless steel (15W°/Km) having:
- a diameter of 100 mm
- a length of 100 mm and
- a wall thickness of 1.5 mm the flow of heat through the cylinder wall, without taking account of the losses, was reduced to about 0.075 W°/k, which signifies that in the case of a recuperator temperature of 300° C., only about 20W could be dissipated through the burner cap 7. In consequence, there is, with a sheet metal contact shield 32 affixed to the burner cap 7, a remaining overtemperature with respect to the environment of less than 20° K.

Although the invention has been described with respect to particular illustrated embodiments, it will be understood that modifications and variations are possible within the inventive concept.

I claim:

1. A burner suitable for heating a furnace chamber for an industrial process and comprising a tubular recuperative preheater of combustion air having at least an outer annular channel for removal of combustion product gases, a combustion chamber at one end of said burner, for heating a furnace, and a feed-through burner cap located at the other end of said burner for access to said burner outside and said furnace and having means through which fuel and combustion can be controllably supplied to said burner, said combustion chamber, tubular recuperative preheater and burner cap being substantially aligned on a central axis of said burner and said tubular recuperative preheater being in fixed spatial position relative to said burner cap for supporting said burner cap outside of said furnace and having, at its end which is opposite said combustion chamber, an outflow collector cap connected to an outflow pipe for combustion product gases, said tubular recuperative preheater also being connected for axially countercurrent flow of combustion air supply to said combustion chamber and combustion product gas from said combustion chamber in respective channels which are thermally coupled to each other for heat transfer, comprising:
- a fuel supply pipe coaxial with said central axis and extending from said feed-through burner cap to said combustion chamber and
- a spacer sleeve (29) of a material having small heat conductivity located in the region between said outflow collector cap of said tubular recuperative preheater and said feed-through burner cap and mounted on said burner cap and said tubular recuperative preheater for maintaining the relative positions of said burner cap and said tubular recuperative preheater, whereby said burner cap is thermally isolated from hot parts of said burner.

2. A burner according to claim 1, wherein said thermal spacer sleeve is held in position by axially resilient compression means.

3. A burner according to claim 2, wherein said spacer sleeve (29) is held in position by spring mounted tension rods (30, 31) extending from said burner cap (7) to said tubular recuperative preheater.

4. A burner according to claim 3, wherein said tension rods extend from said burner cap to said outflow collector cap of said tubular recuperative preheater, said collector cap being of annular configuration.

5. A burner according to claim 3, wherein said spacer sleeve (29) is made of an austenitic steel.

6. A burner according to claim 3, wherein said annular outflow collector cap of said tubular recuperative preheater is connected to a combustion product gas pipe (3) coaxial with said central axis.

7. A burner according to claim 6, wherein said outflow collector cap is of annular configuration and the connection between said outflow collector cap (14) and said combustion product duct pipe (3) contains resilient pressure elements by which said combustion product duct pipe is elastically subject to a pressing force towards said outflow collector cap in the region of sealing surfaces thereof.

8. A burner according to claim 3, wherein said annular outflow collector cap of said tubular recuperative preheater is connected to a jacketed jet heating tube (3a) coaxial with said central axis.

9. A burner according to claim 8, wherein said outflow collector cap is of annular configuration and the connection between said outflow collector cap (14) and said jacketed jet heating tube (3a) contains resilient pressure elements by which said jacketed jet heating tube is elastically subject to a pressing force towards said outflow collector cap in the region of sealing surfaces thereof.

10. A burner according to claim 1, wherein said spacer sleeve (29) is made of an austenitic steel.

11. A burner according to claim 1, wherein said outflow collector cap of said tubular recuperative preheater is connected to a combustion product gas pipe (3) coaxial with said central axis.

12. A burner according to claim 11, wherein said outflow collector cap is of annular configuration and the connection between said outflow collector cap (14) and said combustion product duct pipe (3) contains resilient pressure elements by which said combustion product duct pipe is elastically subject to a pressing force towards said outflow collector cap in the region of sealing surfaces thereof.

13. A burner according to claim 1, wherein said annular outflow collector cap of said tubular recuperative preheater is connected to a jacketed jet heating tube (3a) coaxial with said central axis.

14. A burner according to claim 13, wherein said outflow collector cap is of annular configuration and the connection between said outflow collector cap (14) and said jacketed jet heating tube (3a) contains resilient pressure elements by which said jacketed jet heating tube is elastically subject to a pressing force towards said outflow collector cap in the region of sealing surfaces thereof.

15. A burner according to claim 1, wherein at least one of said spacer sleeve (29) and said outflow collector cap (14) is surrounded by a contact-prevention shield.

16. A burner according to claim 15, wherein said contact-prevention shield has a shield element (32) which is fastened to said burner cap (7).

17. A burner according to claim 1, wherein said tubular recuperative preheater is at least in part made of ceramic material.

* * * * *